US011717941B2

(12) United States Patent
Greif et al.

(10) Patent No.: US 11,717,941 B2
(45) Date of Patent: Aug. 8, 2023

(54) TOOL OR WORKPIECE HOLDER

(71) Applicant: Ott-Jakob Spanntechnik GmbH, Lengenwang (DE)

(72) Inventors: Josef Greif, Friesenried (DE); Wolfgang Bechteler, Ebenhofen (DE); Conrad Rösch, Pfronten (DE); Maximilian Horn, Wertach (DE)

(73) Assignee: Ott-Jakob Spanntechnik GmbH, Lengenwang (DE)

( * ) Notice: Subject to any disclaimer, the term of this patent is extended or adjusted under 35 U.S.C. 154(b) by 39 days.

(21) Appl. No.: 17/391,116

(22) Filed: Aug. 2, 2021

(65) Prior Publication Data

US 2022/0040821 A1 Feb. 10, 2022

(30) Foreign Application Priority Data

Aug. 4, 2020 (DE) .................. 10 2020 120 525.2

(51) Int. Cl.
*B25B 5/10* (2006.01)
*B23B 29/04* (2006.01)

(52) U.S. Cl.
CPC ............. *B25B 5/10* (2013.01); *B23B 29/04* (2013.01)

(58) Field of Classification Search
CPC .......... B25B 1/103; B25B 1/125; B25B 1/24; B25B 1/2405; B25B 1/2473;
(Continued)

(56) References Cited

U.S. PATENT DOCUMENTS 8,256,773 B2 * 9/2012 Sandmeier ........... B23Q 1/0072
279/123
10,661,449 B2 * 5/2020 Zachary .................. B23B 31/30
(Continued)

FOREIGN PATENT DOCUMENTS

| DE | 1004889 B | 3/1957 |
| DE | 102005012869 A1 | 9/2006 |
| DE | 102014102082 A1 | 8/2015 |

OTHER PUBLICATIONS

Result of examination report for German Patent Application No. 10 2020 120 525.2 filed Aug. 4, 2020.

*Primary Examiner* — Lee D Wilson
*Assistant Examiner* — Robert F Neibaur
(74) *Attorney, Agent, or Firm* — Paul D. Bianco; Katharine Davis Wong; Fleit Intellectual Property Law

(57) ABSTRACT

A tool or workpiece holder with a receiving body and a clamping device for clamping a tool or a workpiece in a receiving opening of the receiving body. The clamping device comprises a first clamping element, which can be moved in a receiving portion of the receiving body at right angles to a central axis of the receiving opening, and a second clamping element, which can be moved relative to the first clamping element at right angles to the central axis of the receiving opening by means of an actuating element. The second clamping element has conical bottom clamping surfaces on the two clamping elements for inserting the tool or workpiece into the receiving opening. An ejecting mechanism is disposed on the first clamping element for ejecting the tool or workpiece from the receiving opening when the clamping elements are moved into a disengaged position.

16 Claims, 3 Drawing Sheets

(58) Field of Classification Search
CPC ..... B25B 1/2489; B25B 1/2484; B25B 5/006; B25B 11/02; B23Q 1/0072; B23Q 1/0081; B23Q 1/009; B23Q 3/102; B23Q 3/103; B23Q 3/105; B23Q 3/106; B23Q 2703/12; B25J 15/0408; F16B 21/073; Y10S 279/904
USPC ............ 269/43, 54, 136, 138, 166, 244, 271
See application file for complete search history.

(56) References Cited

U.S. PATENT DOCUMENTS

| | | | |
|---|---|---|---|
| 10,987,769 B2* | 4/2021 | Taylor | F16B 2/12 |
| 11,090,775 B2* | 8/2021 | Chou | B23Q 1/0072 |
| 11,498,171 B2* | 11/2022 | Taniguchi | B23Q 3/1554 |
| 11,504,817 B2* | 11/2022 | Taylor | B23Q 1/0072 |
| 11,618,115 B2* | 4/2023 | Maurer | B23B 31/1072 |
| | | | 269/309 |
| 2007/0187909 A1 | 8/2007 | Troxler | |
| 2022/0297316 A1* | 9/2022 | Lyhr Jensen | B25J 15/0491 |

\* cited by examiner

TOOL OR WORKPIECE HOLDER

FIELD OF THE DISCLOSURE

The disclosure relates to a tool or workpiece holder.

BACKGROUND

DE 10 2014 102 082 A1 discloses a tool holder in the form of a tool turret, having a receiving body and a clamping device for clamping a tool in a receiving opening of the receiving body. The clamping device has two clamping elements which can be moved relative to one another at right angles to a central axis of the receiving opening by means of a shared actuating element. The clamping elements can be moved not only relative to one another but also in the receiving body, which ensures accurate and centric clamping even in cases of an inaccurate placement in the holder or in the presence of dirt. Undesired tilting movements or a slanting of the tools or workpieces can be avoided. However, the tools are inserted into the generally conical receiving openings of the turret body with a relatively high force, which can lead to problems during the removal of the tools.

SUMMARY

One aspect of the disclosure relates to a tool or workpiece holder as set forth above, which also allows the tool or workpiece to be easily and simply removed.

Appropriate advanced modifications and advantageous embodiments are also disclosed herein.

The clamping device of the tool or workpiece holder according to the disclosure comprises a first clamping element, which can be moved in a receiving portion of a receiving body at right angles to a central axis of a receiving opening, and a second clamping element, which can be moved relative to the first clamping element at right angles to the central axis of the receiving opening by means of an actuating element and which has conical clamping surfaces on the two clamping elements for inserting the tool or workpiece into the receiving opening. Disposed on the first clamping element is an ejecting mechanism for ejecting the tool or workpiece from the receiving opening when the clamping elements are moved into a disengaged position. When the clamping elements are moved into the disengaged position, the tool or workpiece disposed in the receiving opening is ejected from the receiving opening by means of the ejecting mechanism, which makes it possible to prevent jamming of the tools or workpieces and to remove them more easily.

In a particularly advantageous embodiment, the ejecting mechanism can have ejecting elements with a conical top ejecting surface, which are disposed on the bottom side of the first clamping element. The conical bottom clamping surface of the first clamping element can conveniently be disposed on one side of an opening on the first clamping element, and the ejecting elements can be disposed on the opposite side of the opening. The conical bottom clamping surface of the first clamping element is preferably disposed on the bottom side of a ring segment-shaped clamping region of the first clamping element.

In a second advantageous embodiment, the first clamping element has a recess for receiving the second clamping element. The second clamping element can be movably mounted in this recess.

The second clamping element can consist of a plate-shaped top part and a block-shaped bottom portion. The conical bottom clamping surface of the second clamping element can be disposed on a ring segment-shaped clamping region on one side of the plate-shaped top part. On the other side of the plate-shaped top part, a cut-out for receiving a projection can be provided on the first clamping element.

The second clamping element conveniently has a lateral stop surface for resting against an inside contact surface of a side portion fixedly disposed on the receiving body or of another support portion fixedly disposed relative to the receiving body.

In a particularly advantageous embodiment, the actuating element can be configured as a clamping screw with a first thread in the form of a right-hand thread and a second thread in the form of a left-hand thread so as to be able to change the position of the two clamping elements. Thus, by rotating the actuating element, the two clamping elements can be simultaneously moved toward one another or away from one another. However, the actuating element can also be a clamping screw with a single thread. In that case, the clamping screw can be rotatably mounted via the thread in a complementary tapped hole in the first clamping element and, e.g., can be connected in a rotatably and axially secured manner to the second clamping element via a pin engaging in an interlocking manner in the second clamping element on the end portion thereof.

The two clamping elements, which can be moved relative to one another, can move within a predefined range in the receiving body, which allows the two clamping elements to automatically align themselves relative to the clamping part. Thus, the most accurate clamping position possible can be ensured even if there are potential offsets between the receiving body and the clamping section. Moreover, undesired tilting movements or a slanting of the clamping section can be avoided.

The two clamping elements are preferably designed such that they encircle a clamping pin of a clamping section from two sides. In an embodiment particularly suitable for driven tools, the first clamping element can have a full-length opening. As a result, e.g., tools driven from the bottom side can be clamped in.

The receiving opening of the receiving body can have a universal contour for receiving different tools, tool holders, workpieces or corresponding adapters. Furthermore, a receiving part with a specific inside contour can also be inserted into the receiving opening of the receiving body. Thus, the tool or workpiece holder can be easily adapted to different requirements.

BRIEF DESCRIPTION OF THE DRAWINGS

Additional characteristic features and advantages of the invention follow from the description of preferred embodiments below with reference to the drawings. The drawings show.

DETAILED DESCRIPTION

Figure 1:
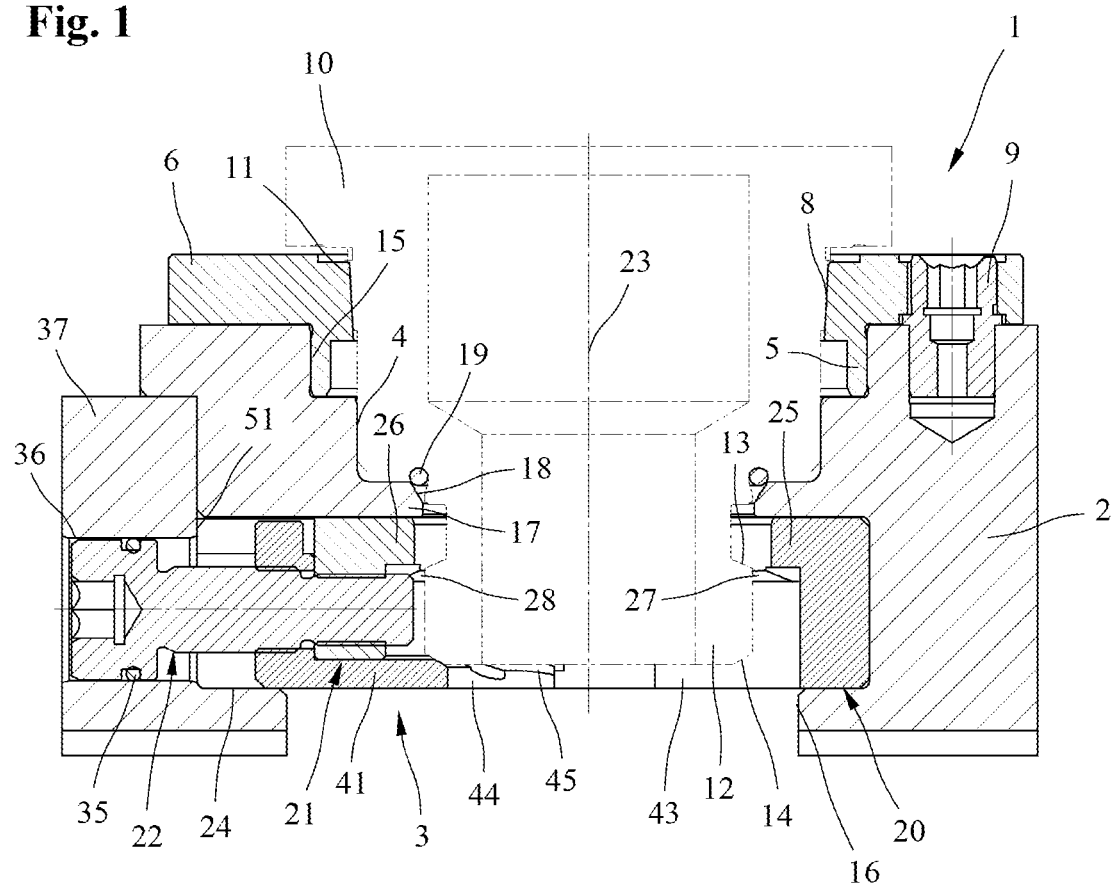
FIG. 1 a sectional view of a tool or workpiece holder with a receiving body and a clamping device disposed in the receiving body in a disengaged position.
Figure 2:
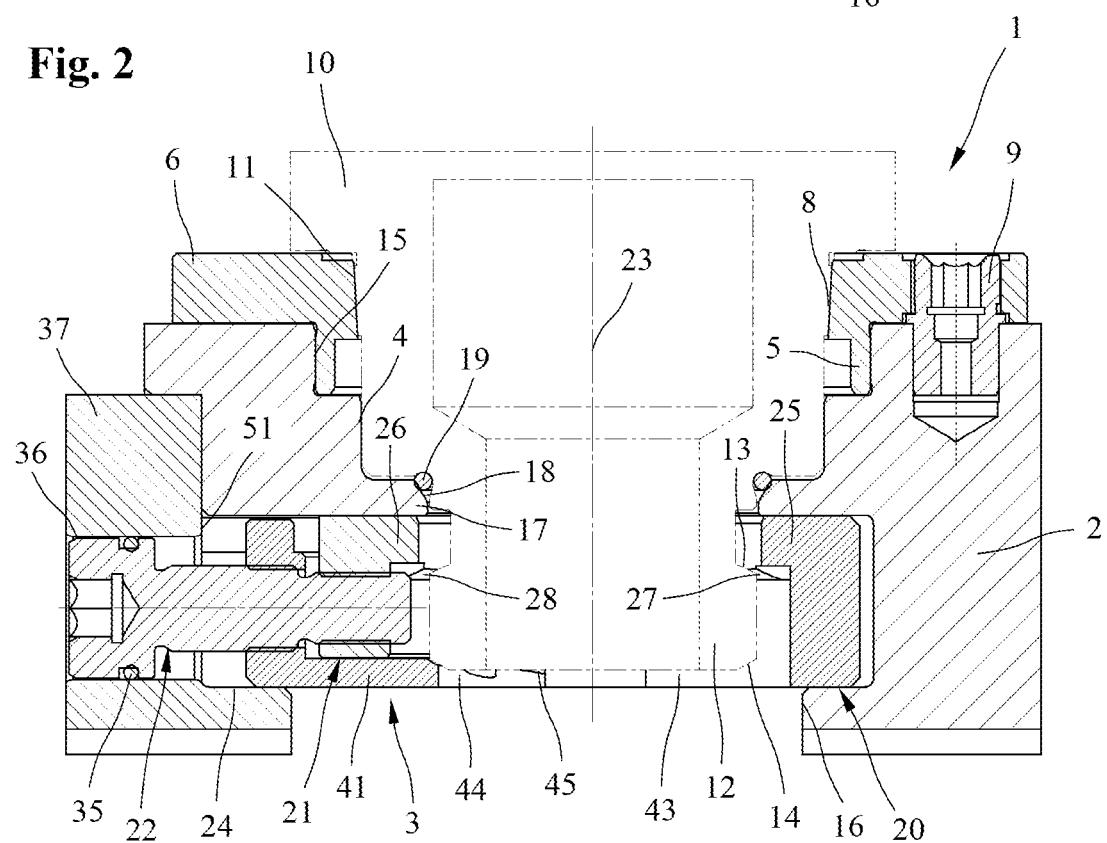
FIG. 2 a sectional view of a tool or workpiece holder with a receiving body and a clamping device disposed in the receiving body in a clamped position.
Figure 3:
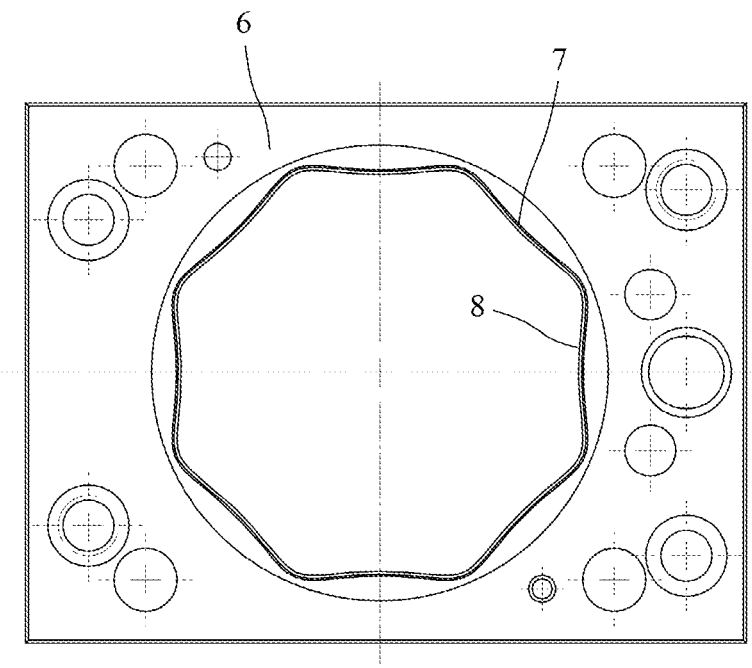
FIG. 3 a top view of a plate-shaped receiving part of the tool or workpiece holder shown in FIGS. 1 and 2.

FIGS. 1 and 2 show sectional views of a tool or workpiece holder 1 having a receiving body 2 and a clamping device 3 disposed in the receiving body 2 for detachably holding a tool or workpiece in a receiving opening 4 of the receiving body 2 in a disengaged position and a clamped position. In the embodiment illustrated, the top surface of the receiving body 2 has a plate-shaped receiving part 6 which engages in the receiving opening 4 by way of an annular collar 5 and which has an inside contour 7 with an inside contact surface 8, with the inside contour, e.g., having the form of a hypotrochoid as illustrated in FIG. 3. It goes without saying that different receiving parts with different inside contours can be used as well. By means of an adjusting screw 9 in the form of an eccentric screw, the receiving part 6, which is rotatably disposed in the receiving opening 4 by way of the annular collar 5, can be easily rotated relative to the receiving body 2. This allows the angular position of the receiving part 6 to be adjusted.

The receiving body 2 with the receiving part 6 is configured to receive a clamping part 10, indicated by the dash-dotted line, having an outside contact surface 11 and a bottom clamping pin 12. A conical top surface 13 and a conical bottom surface 14 are provided on the clamping pin 12. Via the clamping part 10, which is configured, e.g., as a tool or workpiece holder or as an integral part of a tool or workpiece, a tool or a workpiece can be secured in the accurate position on the receiving body 2 by means of the clamping device 3. In the embodiment illustrated, the receiving body 2 is part of a tool turret. The tool turret, for example, can be a star turret with a disk-shaped receiving body 2 and a plurality of receiving openings 4 which are distributed in a star configuration on the circumference of the receiving body. However, the tool turret can also be a disk turret with receiving bodies disposed on the face side of a turret body, or it can have a different suitable configuration. The receiving body 2 can also be a workpiece table or another counter top, onto which a workpiece is clamped.

The receiving opening 4 of the receiving body 2 has an inside contour conforming to the outside contour of the clamping part 10. In the embodiment illustrated, the receiving opening 4 is multi-stepped and contains an expanded top region 15 for receiving the annular collar 5 on the receiving part 6 and a bottom region 16 with a taper 17 for receiving the clamping pin 12. Provided on the radial inside end of the taper 17 is a chamfer 18 for resting against an annular damping or sealing element 19 disposed on the clamping part 10 during insertion of the clamping part 10 into the receiving body 2.

The clamping device 3 consists of two clamping elements 20 and 21 which can be moved relative to one another and which are designed to be moved in opposite directions at right angles to a central axis 23 of the receiving body 2 by means of a shared actuating element 22 and to encircle the clamping pin 12 from both sides. In the embodiment illustrated, the clamping device 3 contains a first slider-type clamping element 20, which can be moved within a respective receiving portion 24 of the receiving body 2 at right angles to the central axis 23 of the receiving body 2, and a second slider-type e clamping element 21, which can be moved relative to the first clamping element 20, which clamping elements can be moved toward one another or away from one another by rotating the actuating element 22, which is here configured as a clamping screw having a right-hand and a left-hand thread.

By rotating the actuating element 22 configured as a clamping screw, the two clamping elements 20 and 21 disposed on opposite sides of the clamping pin 12 can be moved toward one another in the direction of the central axis 23, from a disengaged position shown in FIG. 1, into a clamped position shown in FIG. 2, and, by moving the clamping elements 20 and 21 away from one another, from this clamped position back into the disengaged position. The two clamping elements 20 and 21 have ring segment-shaped clamping regions 25 and 26 facing one another, with said clamping regions having conical bottom clamping surfaces 27 and 28 for resting against the conical top surface 13 of the clamping pin 12.

Figure 8:
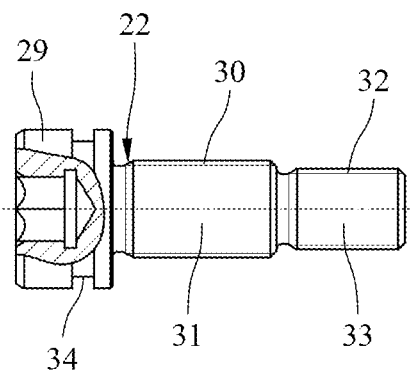
FIG. 8 a screw-shaped actuating element of the tool or workpiece holder shown in FIG. 1.

The actuating element 22, shown separately in FIG. 8, is configured as a clamping screw with a cylindrical screw head 29, a first left-hand thread 30 on a rear shaft portion 31 and a second right-hand thread 32 on a slimmer front shaft portion 33. Disposed in the screw head 29 is an annular groove 34 for receiving an elastic ring 35, which can be seen in FIG. 1. Via the elastic ring 35, the screw-shaped actuating element 22 is secured against falling out into a bore 36 of a lateral part 37, which is rigidly connected to the receiving body 2, but is movably mounted in the axial direction.

Figure 4:
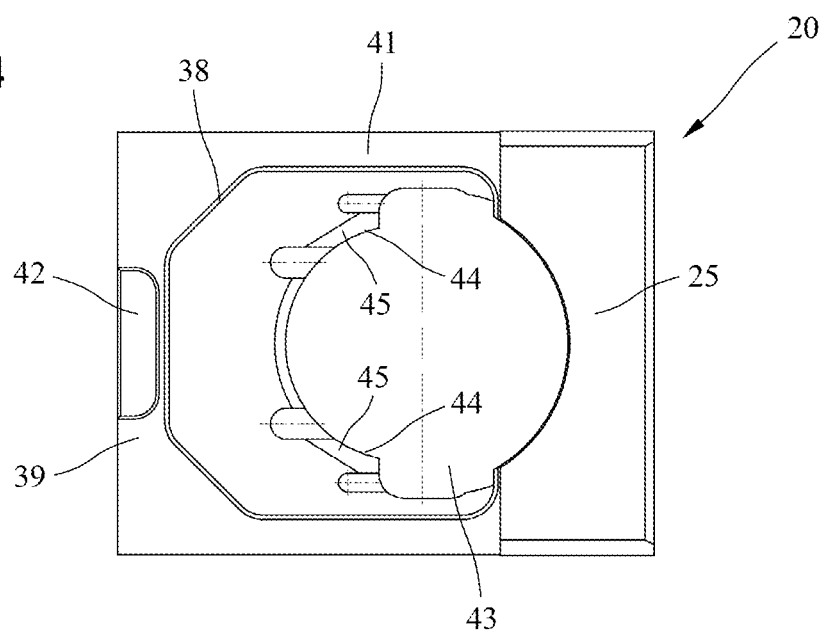
FIG. 4 a top view of a first clamping element of the tool or workpiece holder shown in FIG. 1.
Figure 5:
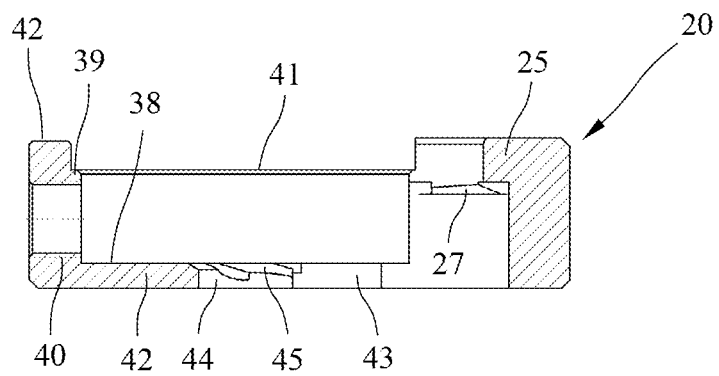
FIG. 5 a sectional view of the first clamping element.

As FIGS. 4 and 5 indicate, the slider-type first clamping element 20 consists of a part having a ring segment-shaped clamping region 25, which is disposed in the receiving body 2 on one side of the receiving opening 4, and a part having a recess 38 disposed in the receiving body 2 on the other side of the receiving opening 4 for receiving the second clamping element 21. The recess 38 is disposed between the ring segment-shaped clamping region 25 on one side of the first clamping element 20 and a cross bar 39 on the other side of the first clamping element 20. A tapped hole 40 pertaining to the second thread 32 of the screw-shaped actuating element 22 is provided in the cross bar 39. On the top face, the first clamping element 20 has a downwardly offset top surface 41 with a projection 42 on the cross bar 39. An opening 43, which is circular when seen in a top view, is provided in the first clamping element 20 for receiving the clamping pin 12 of the clamping part 10. In the embodiment illustrated, the opening 43 is configured as a full-length opening. Thus, e.g., tools driven from the bottom side can be clamped in as well.

The first clamping element 20 also contains an ejecting mechanism which comprises ejecting elements 44, which are disposed on the bottom side of the first clamping element 20, with a conical top ejecting surface 45 for resting against the conical bottom surface 14 of the clamping pin 12. In the embodiment illustrated, the ejecting elements 44 are configured as ring segment-shaped extension pieces, which project inwardly relative to the opening 43. By means of the ejecting mechanism, the clamping part 10 can be ejected from the receiving opening 4 of the receiving body 2 when the clamping elements 20 and 21 move into a disengaged position, thereby making the removal of a workpiece or tool easier.

Figure 6:
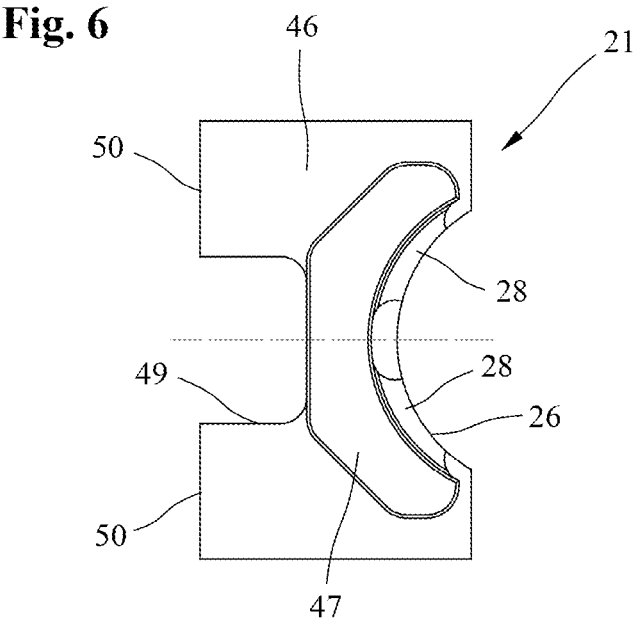
FIG. 6 a bottom view of a second clamping element of the tool or workpiece holder shown in FIG. 1.
Figure 7:
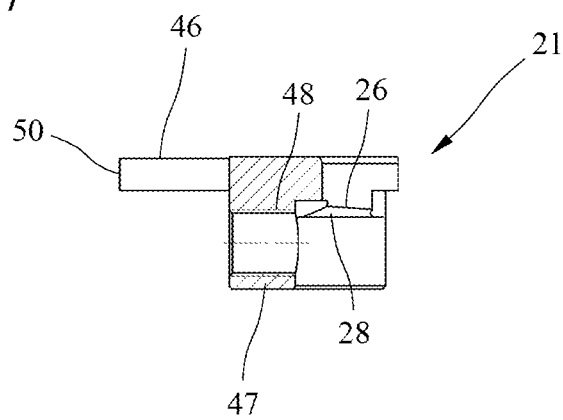
FIG. 7 a sectional view of the second clamping element.

The second clamping element 21 shown in FIGS. 6 and 7 is movably mounted in the recess 38 of the first clamping element 20. The second clamping element 21, shown in a bottom view in FIG. 6, comprises a plate-shaped top part 46 and a block-shaped bottom part 47. The plate-shaped top part 46 is intended to rest on the top surface 41, and the bottom part 47 is intended to engage in the recess 38 of the first clamping element 20. A tapped hole 48 is provided in the bottom part 47 for receiving the first thread on the actuating element 22. The ring segment-shaped clamping region 26 having conical bottom clamping surfaces 28 is disposed on one side of the plate-shaped top part and, on the other side, a cut-out 49 for receiving the projection 42 on the first clamping element 20 is provided. On the side of the cut-out 49, the second clamping element has a lateral stop surface 50 on its plate-shaped top part 46 for resting against an inside contact surface 51 of the lateral part 37, which is rigidly disposed on the receiving body 2, and which can be seen in FIG. 1.

As can be seen from FIGS. 1 and 2, the two clamping elements 20 and 21 are configured such that they encircle the clamping pin 12 of the clamping part 10 from both sides. The two diametrically opposite clamping regions 25 and 26 are configured as ring segments. This ensures a good clamping and pull-in force.

By rotating the actuating element 22, designed here in the form of a clamping screw, the clamping elements 20 and 21 can be moved between the disengaged position shown in FIG. 1 and the clamped position shown in FIG. 2. For example, if the actuating element 22 in the disengaged position of FIG. 1 is turned to the right, the two clamping elements 20 and 21 are moved toward one another by means of the screw-shaped actuating element 22 and pulled against the clamping pin 12 of the clamping part 10. This causes the clamping part 10 to be pulled into the receiving opening 4. Even if the two clamping elements 20 and 21 are not centered relative to the clamping part 10, the ability of the actuating element 22 to move in the axial direction allows the clamping elements 20 and 21 to align themselves so that undesired tilting movements and a slanting of the tools or workpieces can be prevented. In the clamped position, no support for the two clamping elements 20 and 21 is provided on the receiving body 2, whereby the occurrence of tilting moments can be avoided.

In contrast, if, in the clamped position shown in FIG. 2, the screw-shaped actuating element 22 is turned to the left, the two clamping elements 20 and 21 are moved away from one another until the stop surface 50 of the second clamping element 21 comes to rest against the contact surface 51 which is stationary relative to the receiving body 2. By continuing to turn the actuating element 22 in the disengaging direction, the ejecting surface 45 of the first clamping element 20 is moved under the clamping pin 12 so that the clamping part 10 is ejected from the receiving opening 4. Thus, by moving the two clamping elements 20 and 21, it is possible not only to pull the clamping part 10 into the receiving opening 4 but also to eject it from said opening.

LIST OF REFERENCE CHARACTERS

1 Tool or workpiece holder
2 Receiving body
3 Clamping device
4 Receiving opening
5 Annular collar
6 Receiving part
7 Inside contour
8 Inside contact surface
9 Adjusting screw
10 Clamping part
11 Outside contact surface
12 Clamping pin
13 Conical top surface
14 Conical bottom surface
15 Top region
16 Bottom region
17 Taper
18 Chamfer
19 Damping or sealing element
20 First clamping element
21 Second clamping element
22 Actuating element
23 Central axis
24 Receiving portion
25 Clamping region
26 Clamping region
27 Clamping surface
28 Clamping surface
29 Screw head
30 First thread
31 Rear shaft portion
32 Second thread
33 Front shaft portion
34 Annular groove
35 Ring
36 Bore
37 Lateral part
38 Recess
39 Cross bar
40 Tapped hole
41 Top surface
42 Projection
43 Opening
44 Ejecting element
45 Ejecting surface
46 Top part
47 Bottom part
48 Tapped hole
49 Cut-out
50 Stop surface
51 Contact surface

The invention claimed is:

1. A tool or workpiece holder comprising a receiving body and a clamping device for clamping a tool or a workpiece in a receiving opening of the receiving body, wherein the clamping device has a first clamping element, which is movable in a receiving portion of the receiving body at right angles to a central axis of the receiving opening, and a second clamping element, which is movable relative to the first clamping element at right angles to the central axis of the receiving opening by an actuating element configured as a clamping screw having a first left-hand thread and a second right-hand thread, the second clamping element having a conical bottom clamping surface configured for inserting the tool or workpiece into the receiving opening, and wherein, disposed on the first clamping element is an ejecting mechanism including an ejection element, having a conical top ejecting surface, disposed on a bottom side of the first clamping element, the ejection element configured for ejecting the tool or workpiece from the receiving opening when the first and second clamping elements are moved into a disengaged position.

2. The tool or workpiece holder of claim 1, wherein the first clamping element comprises an opening having a circular shape in a top view of the tool or workpiece holder and wherein a conical bottom clamping surface of the first clamping element is disposed on one side of the opening and the ejecting element is disposed on an opposite side of the opening from the conical bottom clamping surface of the first clamping element.

3. The tool or workpiece holder of claim 2, wherein the ejecting element is configured as a ring-shaped extension piece projecting inwardly relative to the opening in the first clamping element.

4. The tool or workpiece holder of claim 3, wherein the conical bottom clamping surface of the first clamping element is disposed on a bottom side of a ring-shaped clamping region of the first clamping element.

5. The tool or workpiece holder of claim 1, wherein the first clamping element further comprises a recess for receiving the second clamping element.

6. The tool or workpiece holder of claim 1, wherein the second clamping element comprises a plate-shaped top part and a block-shaped bottom part.

7. The tool or workpiece holder of claim 6, wherein the conical bottom clamping surface of the second clamping element is disposed in a ring-shaped clamping region on one side of the plate-shaped top part.

8. The tool or workpiece holder of claim 7, wherein, on another side of the plate-shaped top part, a cut-out for receiving a projection is disposed on the first clamping element.

9. The tool or workpiece holder of claim 1, wherein the second clamping element comprises a lateral stop surface configured for resting against an inside contact surface of a lateral part fixedly disposed on the receiving body.

10. The tool or workpiece holder of claim 1, wherein the first clamping element has a first tapped hole configured for receiving the actuating element.

11. The tool or workpiece holder of claim 10, wherein the second clamping element has a second tapped hole configured for receiving the actuating element.

12. The tool or workpiece holder of claim 1, wherein the first and second clamping elements are configured such that they encircle a clamping pin of a clamping part from both sides.

13. A tool or workpiece holder comprising a receiving body and a clamping device for clamping a tool or a workpiece in a receiving opening of the receiving body, wherein the clamping device has a first clamping element, which is movable in a receiving portion of the receiving body at right angles to a central axis of the receiving opening and has a first conical bottom clamping surface configured for inserting the tool or workpiece into the receiving opening, and a second clamping element, which is movable relative to the first clamping element at right angles to the central axis of the receiving opening by an actuating element and has a second conical bottom clamping surface configured for inserting the tool or workpiece into the receiving opening, wherein, disposed on the first clamping element is an ejecting mechanism including an ejection element, having a conical top ejecting surface, disposed on a bottom side of the first clamping element, the ejection element configured for ejecting the tool or workpiece from the receiving opening when the first and second clamping elements are moved into a disengaged position, and wherein the first clamping element includes an opening having a circular shape in a top view of the tool or workpiece holder and the first conical bottom clamping surface of the first clamping element is disposed on one side of the opening relative to the central axis of the receiving opening and the ejecting element is disposed on an opposite side of the opening relative to the central axis of the receiving opening.

14. The tool or workpiece holder of claim 13, wherein the ejecting element is configured as a ring-shaped extension piece projecting inwardly relative to the opening in the first clamping element.

15. A tool or workpiece holder comprising a receiving body and a clamping device for clamping a tool or a workpiece in a receiving opening of the receiving body, wherein the clamping device has a first clamping element, which is movable in a receiving portion of the receiving body at right angles to a central axis of the receiving opening, and a second clamping element, which is movable relative to the first clamping element at right angles to the central axis of the receiving opening by an actuating element, the second clamping element having a plate-shaped top part and a block-shaped bottom part in which a conical bottom clamping surface of the second clamping element is disposed in a ring-shaped clamping region on one side of the plate-shaped top part and wherein, disposed on the first clamping element is an ejecting mechanism including an ejection element, having a conical top ejecting surface, disposed on a bottom side of the first clamping element, the ejection element configured for ejecting the tool or workpiece from the receiving opening when the first and second clamping elements are moved into a disengaged position.

16. The tool or workpiece holder of claim 15, wherein, on another side of the plate-shaped top part, a cut-out for receiving a projection is disposed on the first clamping element.

* * * * *